US009774175B2

(12) United States Patent
Barker et al.

(10) Patent No.: US 9,774,175 B2
(45) Date of Patent: Sep. 26, 2017

(54) CABLE INSTALLATION APPARATUS

(75) Inventors: Philip Alfred Barker, Ipswich (GB); Keith Eric Nolde, Ipswich (GB)

(73) Assignee: British Telecommunications Public Limited Company, London (GB)

( * ) Notice: Subject to any disclaimer, the term of this patent is extended or adjusted under 35 U.S.C. 154(b) by 210 days.

(21) Appl. No.: 13/120,124

(22) PCT Filed: Sep. 18, 2009

(86) PCT No.: PCT/GB2009/002222
§ 371 (c)(1),
(2), (4) Date: Mar. 21, 2011

(87) PCT Pub. No.: WO2010/034970
PCT Pub. Date: Apr. 1, 2010

(65) Prior Publication Data
US 2011/0178713 A1 Jul. 21, 2011

(30) Foreign Application Priority Data
Sep. 26, 2008 (GB) .................................. 0817639.8

(51) Int. Cl.
*H02G 1/08* (2006.01)
*G02B 6/44* (2006.01)

(52) U.S. Cl.
CPC ........... *H02G 1/086* (2013.01); *G02B 6/4464* (2013.01)

(58) Field of Classification Search
CPC .............................. H02G 1/086; G02B 6/4464
USPC .......................... 702/12, 50; 73/152.29, 49.5
See application file for complete search history.

(56) References Cited

U.S. PATENT DOCUMENTS

| 3,680,378 | A |   | 8/1972  | Aurilio et al. |
|-----------|---|---|---------|----------------|
| 3,814,935 | A |   | 6/1974  | Kissel         |
| 4,357,918 | A | * | 11/1982 | Asano ...................... 123/406.36 |
| 4,471,651 | A |   | 9/1984  | Dimeff et al.  |
| 4,850,569 | A |   | 7/1989  | Griffioen et al. |
| 4,856,937 | A | * | 8/1989  | Grocott et al. ............ 405/183.5 |

(Continued)

FOREIGN PATENT DOCUMENTS

DE  4202147  7/1993
DE  19649556  6/1998
(Continued)

OTHER PUBLICATIONS

WO/2007/113544, Philip A. Barker et al.*
(Continued)

*Primary Examiner* — Alexander Satanovsky
(74) *Attorney, Agent, or Firm* — Patterson Thuente Pedersen, P.A.

(57) ABSTRACT

A device for detecting a flow of air from an exit end of a tube fed into an entrance end of the tube, including a bore having a first section with a first size bore size and a second section with a second bore size, an obstruction located within the bore between the first section and the second section, the obstruction configured to obstruct air flowing from the first section to the second section, and fixing means to fix the device to the tube so that the bore communicates with the exit end of the tube, wherein in use, an air pressure sensor is used to compare air pressure within the first bore section and air pressure within the second bore section, so that a pressure differential is indicative of an air flow within the bore.

11 Claims, 3 Drawing Sheets

(56) References Cited

U.S. PATENT DOCUMENTS

| | | | |
|---|---|---|---|
| 4,880,484 A | 11/1989 | Obermeier et al. | |
| 4,948,219 A | 8/1990 | Seino et al. | |
| 5,002,090 A * | 3/1991 | Ichikawa et al. | 137/550 |
| 5,109,598 A | 5/1992 | Koch | |
| 5,121,644 A | 6/1992 | Grey et al. | |
| 5,143,353 A | 9/1992 | Sano et al. | |
| 5,199,689 A | 4/1993 | Proud et al. | |
| 5,211,377 A | 5/1993 | Griffioen et al. | |
| 5,248,128 A | 9/1993 | Warren et al. | |
| 5,467,968 A | 11/1995 | Proud et al. | |
| 5,699,996 A | 12/1997 | Boyle et al. | |
| 5,813,658 A | 9/1998 | Kaminski et al. | |
| 5,835,657 A | 11/1998 | Suarez et al. | |
| 5,953,475 A | 9/1999 | Beier et al. | |
| 6,129,341 A | 10/2000 | Griffioen et al. | |
| 6,192,180 B1 | 2/2001 | Kim | |
| 6,311,953 B1 | 11/2001 | Lang et al. | |
| 6,328,283 B1 | 12/2001 | Reeve et al. | |
| 6,364,290 B1 | 4/2002 | Barker | |
| 6,370,753 B1 | 4/2002 | Washburn | |
| 6,418,264 B1 | 7/2002 | Hough et al. | |
| 6,480,635 B1 | 11/2002 | Russell et al. | |
| 6,631,884 B2 | 10/2003 | Griffioen et al. | |
| 6,694,085 B2 | 2/2004 | Bergqvist et al. | |
| 6,937,033 B2 | 8/2005 | Boronkay et al. | |
| 6,992,580 B2 * | 1/2006 | Kotzin et al. | 340/539.11 |
| 7,021,426 B2 | 4/2006 | Griffioen et al. | |
| 7,064,559 B2 | 6/2006 | Bissonnette et al. | |
| 7,151,878 B2 | 12/2006 | Sutehall et al. | |
| 7,209,028 B2 | 4/2007 | Boronkay et al. | |
| 7,225,533 B2 | 6/2007 | Sylvia et al. | |
| 7,408,474 B2 * | 8/2008 | Frazier et al. | 340/635 |
| 7,418,184 B1 | 8/2008 | Gonzales | |
| 7,562,861 B2 | 7/2009 | Fee et al. | |
| 7,942,382 B2 | 5/2011 | Lecoq et al. | |
| 8,117,923 B2 | 2/2012 | Sasaki | |
| 8,275,227 B2 | 9/2012 | Thurlow et al. | |
| 8,276,883 B2 * | 10/2012 | Heatley et al. | 254/134.3 R |
| 8,350,581 B1 | 1/2013 | Brady et al. | |
| 8,587,327 B2 | 11/2013 | Heatley et al. | |
| 8,702,064 B2 | 4/2014 | Barker et al. | |
| 8,720,030 B2 | 5/2014 | Barker et al. | |
| 8,775,102 B2 | 7/2014 | Heatley et al. | |
| 2002/0034365 A1 | 3/2002 | Vogelsang | |
| 2002/0121440 A1 | 9/2002 | Morris | |
| 2002/0158239 A1 | 10/2002 | Griffioen et al. | |
| 2003/0001592 A1 | 1/2003 | Boronkay et al. | |
| 2003/0006669 A1 | 1/2003 | Pei et al. | |
| 2003/0222663 A1 | 12/2003 | Acosta-Geraldino et al. | |
| 2004/0135588 A1 | 7/2004 | Bissonnette et al. | |
| 2005/0073327 A1 | 4/2005 | Walcott | |
| 2006/0203086 A1 | 9/2006 | Pavlakovic | |
| 2006/0219992 A1 | 10/2006 | Fee et al. | |
| 2006/0275008 A1 | 12/2006 | Xin | |
| 2007/0047894 A1 | 3/2007 | Holmberg et al. | |
| 2007/0104447 A1 | 5/2007 | Allen | |
| 2008/0011990 A1 | 1/2008 | Kostet et al. | |
| 2008/0013893 A1 | 1/2008 | Zheng et al. | |
| 2008/0013907 A1 | 1/2008 | Zumovitch et al. | |
| 2008/0050083 A1 | 2/2008 | Frazier et al. | |
| 2008/0205844 A1 | 8/2008 | Castonguay | |
| 2008/0267714 A1 | 10/2008 | Lecoq et al. | |
| 2009/0007640 A1 | 1/2009 | Heatley et al. | |
| 2009/0010606 A1 | 1/2009 | Thurlow et al. | |
| 2009/0026429 A1 | 1/2009 | Barker et al. | |
| 2009/0065547 A1 | 3/2009 | Heatley et al. | |
| 2009/0065753 A1 | 3/2009 | Gonen et al. | |
| 2009/0166597 A1 | 7/2009 | Weaver et al. | |
| 2010/0148138 A1 * | 6/2010 | Baker | F16L 7/00 254/134.3 R |
| 2010/0155681 A1 | 6/2010 | Taylor et al. | |
| 2011/0006786 A1 | 1/2011 | Heatley et al. | |
| 2011/0062973 A1 | 3/2011 | Paterson | |
| 2011/0079027 A1 | 4/2011 | Ghan et al. | |
| 2011/0084244 A1 | 4/2011 | Heatley et al. | |
| 2011/0135267 A1 | 6/2011 | Barker et al. | |
| 2011/0178713 A1 | 7/2011 | Barker et al. | |
| 2012/0023723 A1 | 2/2012 | Barker et al. | |
| 2012/0029846 A1 | 2/2012 | Heatley et al. | |
| 2013/0011110 A1 | 1/2013 | Kerry et al. | |

FOREIGN PATENT DOCUMENTS

| | | | |
|---|---|---|---|
| DE | 10338950 | 6/2005 | |
| EP | 108590 | 5/1984 | |
| EP | 253636 | 1/1988 | |
| EP | 0292037 | 11/1988 | |
| EP | 0294243 | 12/1988 | |
| EP | 0319194 | 6/1989 | |
| EP | 0319194 A1 | 6/1989 | |
| EP | 1 273 902 A2 | 1/2003 | |
| EP | 1333303 | 8/2003 | |
| EP | 1593994 | 11/2005 | |
| EP | 1022569 | 7/2007 | |
| EP | 1 832 903 A1 | 9/2007 | |
| EP | 1 832 908 A1 | 9/2007 | |
| EP | 1832903 A1 * | 9/2007 | G02B 6/00 |
| EP | 1843181 | 10/2007 | |
| FR | 2737053 | 1/1997 | |
| FR | 2872299 | 12/2005 | |
| GB | 388966 A | 3/1933 | |
| GB | 2073440 | 10/1981 | |
| GB | 2 219 662 A | 12/1989 | |
| GB | 2316496 | 2/1998 | |
| GB | 2388966 | 11/2003 | |
| JP | S59151041 A | 8/1984 | |
| JP | 5-328559 | 12/1993 | |
| JP | 08163737 | 6/1996 | |
| JP | 408178722 A * | 7/1996 | F02D 35/00 |
| JP | 2000217216 | 8/2000 | |
| JP | 2000217216 A | 8/2000 | |
| JP | 4240806 | 3/2009 | |
| SU | 1 000 750 A1 | 2/1983 | |
| WO | WO88/00713 | 1/1988 | |
| WO | WO91/03756 | 3/1991 | |
| WO | WO95/23988 | 9/1995 | |
| WO | WO98/12588 | 3/1998 | |
| WO | WO99/12066 | 3/1999 | |
| WO | WO2006/103419 | 10/2006 | |
| WO | WO2006/103424 | 10/2006 | |
| WO | WO 2007/101975 A1 | 9/2007 | |
| WO | WO2007104910 | 9/2007 | |
| WO | WO2007104913 | 9/2007 | |
| WO | WO 2007/113544 A1 | 10/2007 | |
| WO | WO 2007/113549 A1 | 10/2007 | |
| WO | WO2007113519 | 10/2007 | |
| WO | WO2007113549 | 10/2007 | |
| WO | WO2008/119976 | 10/2008 | |
| WO | WO2009/083722 | 7/2009 | |
| WO | WO2009083715 | 7/2009 | |
| WO | WO2009083721 | 7/2009 | |
| WO | WO2009/131895 | 10/2009 | |
| WO | WO2010004288 | 1/2010 | |
| WO | WO2010034970 | 4/2010 | |

OTHER PUBLICATIONS

International Search Report for International Application No. PCT/GB2008/004277 dated May 28, 2009.
International Search Report for International Application No. PCT/GB2008/004281 dated May 28, 2009.
International Search Report for International Application No. PCT/GB2010/000635 dated May 6, 2011.
International Search Report for International Application No. PCT/GB2009/002222 dated Feb. 4, 2010.
International Search Report for International Application No. PCT/GB2007/003811 mailed Jan. 11, 2008.
International Search Report for International Application No. PCT/GB2010/000487dated Jul. 15, 2010.
Application and File History for U.S. Appl. No. 12/445,844, filed Apr. 16, 2009, inventors Taylor et al.
Application and File History for U.S. Appl. No. 12/810,731, filed Sep. 21, 2010, inventors Heatley et al.

(56) References Cited

OTHER PUBLICATIONS

Application and File History for U.S. Appl. No. 12/810,737, filed Dec. 21, 2010, inventors Heatley et al.
Application and File History for U.S. Appl. No. 13/260,105, filed Sep. 23, 2011, inventors Barker et al.
IEEE Guide for the Design and Installation of Cable Systems in Substations. Apr. 2008. 132 pages.
Draft Recommended Practices for Cable Installation in Generating Stations and Industrial Facilities, Jan. 2010. 94 pages.
International Search Report and Written Opinion for International Application No. PCT/GB2011/000432 dated Jun. 29, 2011.
International Search Report for International Application No. PCT/GB2007/000455 mailed Mar. 28, 2007.
International Search Report for International Application No. PCT/GB2007/001216 mailed Jul. 19, 2007.
Fist-GC02-F, Flat FIST generic closure organizer, Tyco Electronics Raychem, Belgium, as available on Sep. 26, 2012, at http://www.te.com/content/dam/te/global/english/industries/telecom-emea/products/documents/fiber-closures/TC-1032-DS-5-09-11.pdf.
Application and File History for U.S. Appl. No. 13/637,613, filed Sep. 26, 2012, inventors Kerry et al.
Application and File History for U.S. Appl. No. 12/281,384, filed Sep. 2, 2008, inventors Thurlow et al.
Application and File History for U.S. Appl. No. 12/295,750, filed Oct. 2, 2008, inventors Baker et al.
Application No. 09785122.4, European Communication dated Mar. 27, 2014, 5 pages.
NASA, "Bernoulli's Equation", 3 pages, dated Mar. 11, 2014.
Application and File History for U.S. Appl. No. 12/810,731, filed Sep. 21, 2010. Inventors: Heatley et al.
Application and File History for U.S. Appl. No. 12/810,737, filed Dec. 21, 2010. Inventors: Heatley et al.
Application and File History for U.S. Appl. No. 12/445,844, filed Apr. 16, 2009. Inventors: Taylor et al.
Application and File History for U.S. Appl. No. 12/281,830, filed Sep. 5, 2008. Inventors: Heatley et al.
International Search Report for PCT Application No. PCT/GB2007/000487, dated Mar. 19, 2007, 3 pages.

* cited by examiner

CABLE INSTALLATION APPARATUS

PRIORITY CLAIM

The present application is a National Phase entry of PCT Application No. PCT/GB2009/002222, filed Sep. 18, 2009, which claims priority from Great Britain Application Number 0817639.8, filed Sep. 26, 2008, the disclosures of which are hereby incorporated by reference herein in their entirety.

TECHNICAL FIELD

The invention relates to the installation of cables, such as optical fiber units, wires, electrical cables or the like. More specifically, but not exclusively, the invention relates to the blowing of fibre unit cables through pre-laid conduits.

BACKGROUND

Optical fibers are widely used within telecommunication systems for high-speed information transfer. A fiber unit, which could comprise a single optical fiber, or a bundle of optical fibers, is commonly installed into a protective optical conduit comprising optical fiber tubes, which have already been laid along the desired route, usually as a continuous span between convenient access points such as surface boxes or inspection chambers.

In this description, references to "cables" shall include where the context permits, individual optical fibers and fiber units as well as cables comprising such fibers and fiber units. "Conduits" shall include tubes and tube bores, but in the main refers to the route or path populated or to be populated by a fiber cable, and where the route comprises a number of tubes, the entire length of the route.

The conduits typically are made of plastic, each with a typical inner diameter of 3 to 6 mm or more, and are usually provided in a bundle comprising up to 24 or more tubes, which are held together within a protective outer sheath. Each fiber conduit tube can receive at least one fiber unit comprising one or more individual optical fibres. Large numbers of conduits—and bundles of conduits—are pre-installed across the access network and the distribution network between the local exchanges and the customer premises in a branching network system. With the move to pushing fiber links closer to customer premises (e.g. fiber to the premises "FTTP"), the conduits will further extend to and into commercial and residential premises. Indeed it is a fundamental part of the push to FTTP in e.g. the UK that substantially all the network comprises optical fiber, extending from the core network to as many end customers as possible. To achieve this, optical fiber installation needs to be speedy, cost- and effort-efficient.

Problems may arise during installation, which may result in the fiber unit not reaching the correct destination. During installation, the operator is usually presented with a large number of conduit tubes, which could result in a mistake in identifying the correct conduit, especially if the operator is working in adverse conditions down a manhole or in poor lighting. This may be so even where conduits are color-coded which helps to direct the operator to the correct conduit.

In an installation using the "blown fiber" method which is known from e.g. EP108590, a fiber unit is blown into a tube using pressurised air. If the air is applied into the wrong tube, the fiber unit will emerge in the wrong place (if at all). As it is seldom possible to know the exact length of the conduit route down which the fiber unit is being installed, the operator cannot even accurately know in a timely manner when something has gone wrong.

Currently, installing fiber units using the blown fibre method is relatively labor-intensive in requiring at least two operators: one situated at the head end of the conduit, where during installation air and the fiber unit is installed into the mouth of the conduit, and one at the remote end of the conduit, where air and the fiber unit emerges from the mouth of the conduit. The second remote end operator is required because the remote end is often some distance away—up to a kilometer or more—from the head end. The operator at the head end is therefore unable to know the status of the remote end during an installation—in particular whether air is flowing though the correct tube, and if/when the fiber unit has reached its destination—without a second operator located there.

Methods whereby a single operator at the head end of a conduit can detect the arrival of air, and subsequently, the fiber unit, at the remote end of the conduit are known. A number of them have been developed by the applicants, and include the method discussed in WO2007113549, where an acoustic signal is introduced into a bore within the sensing device which is attached to the far end of the tube so that the bore communicates with the bore of the tube. A phase shift in the acoustic signal resulting from air flowing through and along the bore of the sensing device is detected as being indicative of air flowing from the correct tube. Of course, if no change in the signal is detected, this is a strong indication that air is being fed down the wrong tube at the head end, or less likely, that the device has been fixed to the wrong tube at the far end. It has been found that while this method worked well in optimal conditions, changes in field conditions such as temperature affected performance reliability. Another approach is described in WO2007101975, where a substantially air-tight space is provided within the device housing. A rupture of the housing indicates that air is flowing out of the tube at the far end.

SUMMARY

Embodiments provide methods and devices relating to the installation of cables such as optical fiber units into conduit tubes, in particular, allowing a single operator to operate substantially on his own to determine if air fed into a conduit is reaching its intended destination, and if the fiber unit subsequently fed into the conduit has reached its destination. The invention can be used where the operator has to choose one conduit from a number of possible candidates, or where there is a single conduit but where it is desirable to unambiguously confirm that the air and fiber unit reaches the intended destination.

In one embodiment, a device for detecting a flow of air from an exit end of a tube fed into an entrance end of the tube comprises a bore having a first bore section with a first size bore size and a second bore section with a second bore size, an obstruction located within the bore between the first bore section and the second bore section, the obstruction configured to obstruct air flowing from the exit end of the tube to the second bore section via the first bore section, and fixing means to fix the device to the tube so that the bore communicates with the exit end of the tube, wherein in use, an air pressure sensor is used to compare air pressure within the first bore section and air pressure within the second bore section, so that a pressure differential is indicative of an air flow within the bore.

In embodiments of the sensing device, an airstone is provided so that air flowing out from the far, exiting, end of the tube can leave the device without any undue build up of pressure within. The obstruction provided within the bore causes air within the first section to have a different pressure level from that within the second section. Typically the air pressure level within the first section would be at a higher pressure level that that in the second bore section. The obstruction could comprise a physical impediment within the bore, but in a preferred embodiment, this comprises a narrowing portion of the bore that takes the form of a waist or a neck, so that a back pressure is generated in the air flowing from the first bore section to the second. The two sections of bore could comprise different, or the same, size in diameter.

Air pressure measuring points along the bore, in the form of air outlets in embodiments, are also provided to communicate with the two bore sections, so that pressure differentials between the two sections may be measured e.g. using a pressure sensor or transducer. As noted above, a back pressure is generated by reducing the diameter size of the bore in the direction of air flow from the exit end of the tube towards the airstone, in a preferred embodiment of the device. The reducing or narrowing bore size may be restricted to a specific section of the bore, so that the other sections of the bore have a constant diameter along their respective lengths.

In one implementation, the device is further arranged to detect arrival of a fiber unit or cable as well. This is achieved by providing within the device, such as along the bore, a retaining section which is configured to prevent the further progress of a fiber bead (which is attached to the leading end of a fiber unit, as described below). A sensor is provided at or near to the retaining section which is capable of identifying the presence of the fiber bead. Where the bead is made of a metal, as it usually is, the sensor might comprise an induction coil looped around or about the retaining section within the bore. In embodiments, a signalling unit in the form of a radio unit or other telecommunications component can be included to signal the arrival of air and/or fiber to the head end, as well as a microprocessor to assist in the determining and detection of air and/or fiber arrival at the far end.

In one embodiment, a method of detecting a flow of air from an exit end of a tube comprises fixing a device of an embodiment of the invention to the tube so that a bore within the device communicates with the exit end of the tube, feeding air into an entrance end of the tube, obstructing air flowing from the exit end of the tube to a second bore section of the device via a first bore section of the device, comparing air pressure levels within the first bore section and the second bore section, and signalling a pressure differential from the comparison as being indicative of an air flow within the bore.

BRIEF DESCRIPTION OF THE DRAWINGS

Embodiments of the invention will now be described, by way of example only, with reference to the accompanying drawings, in which.

DETAILED DESCRIPTION

Figure 1:
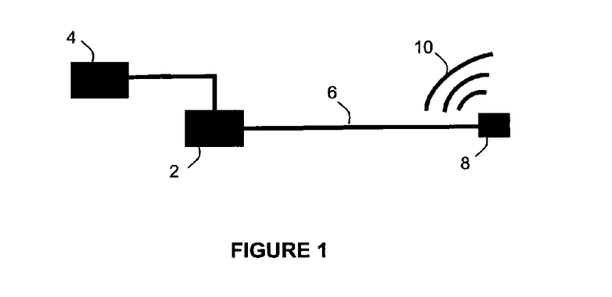
FIG. 1 is a schematic view of the components used in a blown fiber installation according to the prior art.

A simple schematic view of the components used to install optical fiber using the blown fiber technique, is depicted in FIG. 1. At the head end of the installation is a blowing head (2) which comprises mechanical drive means, which push an optical fiber unit or cable into a tube or conduit (6) towards the far end. The blowing head is aided in this task by pressurised air which is fed into the conduit using an air compressor (4), so that the fiber unit within the conduit is at least in part blown through the conduit. An "airstone" (8) is fixed to the far end of the conduit. This comprises a barrier of porous compressed granular material, which will allow air to pass through but which will stop the continued progress of the fiber unit beyond the barrier.

As described above, the conventional process involves a first engineer operating the blowing head and the compressor is located at the head end, while a second engineer is sited at the far end. The second engineer will signal (10) back to the first operator to confirm (i) that the correct conduit has been selected at the head end, as air from the compressor is flowing out of the desired tube mouth, so that the process may now move to the fiber installation stage, and (ii) that the fiber unit has emerged from the tube mouth, so the installation process may be terminated. The signalling may be carried out using any method e.g. by mobile telephone, walkie-talkie or the like.

In the methods and apparatuses described below, the air and fiber detection processes, as well as the signalling (10), are automated.

Figure 2:
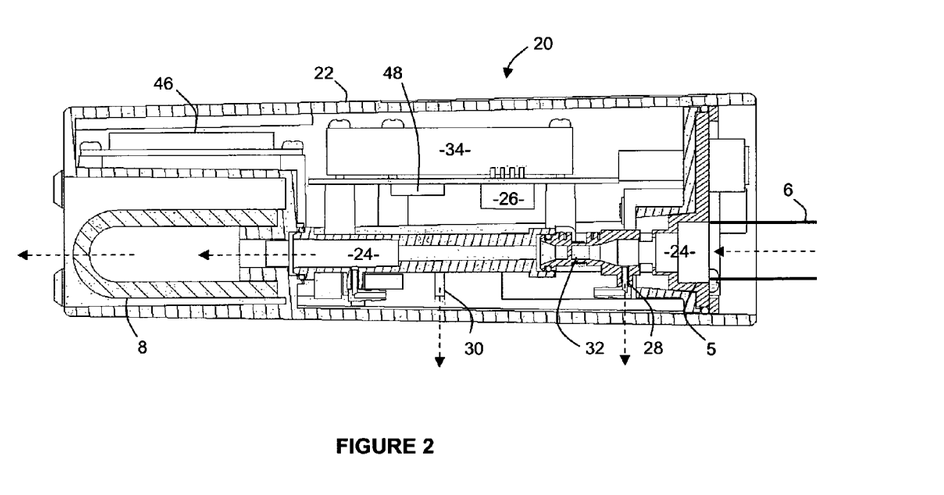
FIG. 2 is a cross sectional view of a sensing device according to the invention.

FIG. 2 shows in cross section a view of an embodiment of a sensing device (20) according to an embodiment. An airstone (8) made of an air-porous material, is provided within the housing (22) of the device. In use, the far end of the tube (6) is fitted to a receiving portion (5) of the device using a conventional interchangeable collet tube connector so that the bore of the tube communicates with the bore (24) of the device leading to the airstone as shown. If the correct tube or conduit has been chosen at the head end, air eventually flows through the device bore and into the device as shown by the dotted arrows. (Of course, if the wrong tube is selected at the head end, no air will flow into the device.) This air is shown in FIG. 2 to pass through the airstone in the known way.

The sensing device further includes a pressure sensor or transducer (26) which is configured to sense air pressure levels within the bore (24), and any changes in pressure levels. The device bore (24) is profiled along its length as shown in FIG. 2, so that it includes a reducing or narrowing portion (32) having a cross section which is reduced relative to the immediately adjacent sections of the bore. Two air outlets (28, 30) are provided to communicate with the bore: the first (28) allows air to exit at a point prior to its reaching the narrowing section of the bore, while the second (30) is provided at a point after the narrowing section.

Figure 3:
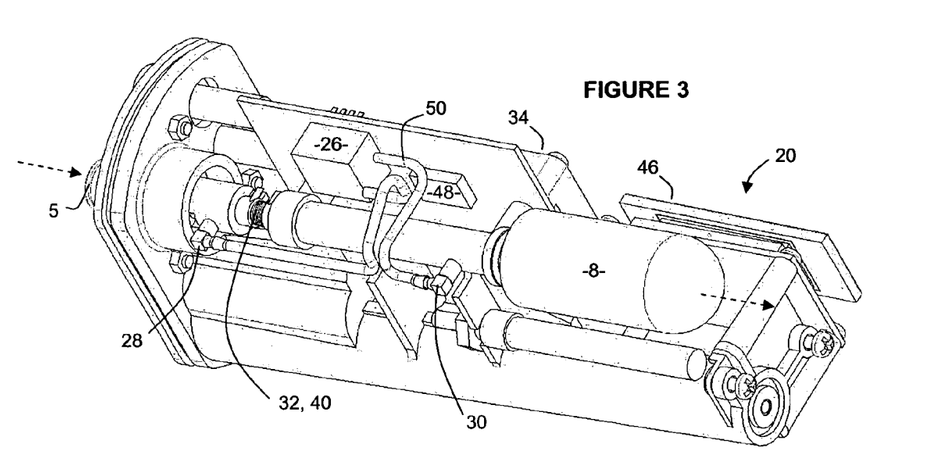
FIG. 3 is a view of the parts making up the sensing device without its housing.

Another view of the device (20) is shown in FIG. 3, which depicts parts of the device without its housing, in particular the narrowing section (32) of the bore leading from the receiving portion (5) with which the conduit engages, to the airstone (8) at the opposite end. The two air outlets (28, 30) are connected to the pressure transducer (26) by tubes (50). Again, air flow into and from the device are depicted by the dotted arrows.

During the installation process, the engineer travels to the far end and affixes the device to the mouth of the conduit so that the conduit bore and the device bore communicate, and powers up the device. He then travels to the head end to start the installation process. If the correct conduit has been selected at the head end, air eventually flows from the mouth of the conduit at the far end, and into the bore (24) of the device. Back pressure is generated when air flows through the narrowing section (32) of the bore, and this increases the air pressure level within the bore just before the narrowing portion in the vicinity of the first air outlet (28). In contrast, the air pressure level in the bore the vicinity of the second outlet (30) is likely to be lower owing to its position beyond the narrowing portion (32). The pressure transducer is arranged to compare the pressure level P1 of air exiting via first air outlet (28), with the pressure P2 of air exiting via the second air outlet (30). The pressure differential of air detected permits the calculation of an air flow rate within the bore.

If this detected air flow rate deviates from a reference or baseline air flow rate (or a range), it serves as a positive unambiguous indication that air is flowing from the mouth of the conduit and into the device at the far end. The baseline value is any which allows for comparison for such purposes, but in one embodiment is calibrated in still air conditions (or else in air which is flowing at a slower rate than the rate being detected). It may be expected that where absence of significant air movement through the bore, the air pressure differential P1 and P2 would be very, or relatively, slight.

The baseline value may be generated during the installation session itself, upon power-up of the device and before the arrival of air at the far end, when the air within the device is relatively still air within the bore at this stage. In one embodiment, the calibration process is carried out in stricter still air conditions, e.g. in a controlled environment as part of the production process. The baseline value will then be based on the geometry of the specific sensing device, its bore profile and in particular its narrowing portion, which between devices may include dimensional variations.

The pressure transducer outputs are sent to and monitored by a microprocessor (48). Its function and the steps it goes through is described in detail below against the flow chart of FIG. 5.

Upon confirmation that the detected air flow rate exceeds or otherwise deviates from the baseline flow value by a predetermined amount, the microprocessor generates a command to a signalling module (34) which confirms to the engineer at the head end that air is flowing from the correct conduit end at the remote end. In one embodiment, the signalling module sends a mobile telephone message which may take the form of a short message service (SMS) text message, or be a pre-recorded voice message which would be harder for the head end operator to miss and has higher priority compared to SMS texts. The skilled person would appreciate that other signalling methods e.g. using a radio signal or the like, may be deployed for this purpose. Upon receiving the confirmatory signal, the engineer may then progress to the next stage of the installation to install the fiber unit.

It is known to affix a "bead" to the leading end or tip of the fiber unit being installed. Such a bead is typically made of a metal such as brass or aluminium, and it protects the otherwise exposed fiber tip from harm when the fiber is being blown through the conduit, and also when the tip reaches and is contained within the airstone (8).

A method for the detection of fiber arrival is described in WO2007113544, which disclosure is incorporated herein by reference in its entirety, and which has been adopted in the design of the present device. Referring back to FIG. 2, the device includes a metal coil (40) which is wound around the device bore at or near its narrowing section (32). The coil forms part of an LC oscillator which resonates at a certain constant frequency. The coil is ideally calibrated as part of its production process in a way which allows for variations in the tolerances of the sensing devices, and to ensure sufficient sensitivity for reliable bead detection of a variety of metallic bead materials.

The coil is located at the narrowing section of the device bore, which is dimensioned to prevent further progress of the bead along the device bore. Upon arrival of the fiber and the bead into the device, the bead is lodged and retained in the narrowing section of the bore. Its proximity to the coil acts as a metallic core which changes the inductance of the coil and the Q-value of the oscillator. Inductance and Q-value changes cause both frequency and amplitude to vary, so either or both can be monitored and measured using a comparator (although as the change in amplitude is typically greater, it may be easier and preferable to monitor this), to provide a clear indication of fibre arrival at the far end to the operator, which may be signalled back in the same way as described above in connection with the detection of air arrival.

In one embodiment, the induction loop is made of a coil of very fine copper wire having a diameter of about 0.2 mm, and the coil will be in the order of 15 turns. However the exact number of turns is not critical to invention, nor is the size of the wire, although the number of turns used is related to the coil diameter.

Variations within the scope of the invention are possible. In the above description, the coil can be located at or near the narrowing section of the bore, which serves the dual purpose of reducing the device bore size for purposes of generating a pressure differential detectable as indicating an air flow, as well as serving as a retainer for the fiber unit bead. However the coil could be located anywhere else within the device as long as it is sufficiently proximate to a location where the fiber bead may be retained e.g. within the airstone, or which it passes allowing for the registration of the momentary or other change in the inductance in the coil indicating that the bead has passed through it.

Different materials will cause the oscillator to resonate at different frequencies. In one embodiment, the coil responds to the arrival of beads made from various metals such as aluminium, brass, steel or copper. Other bead material types may permit alternative fiber unit arrival detection methods. For example, by substituting the induction coil with a magnetic sensor, the arrival of a bead made of a magnetic material (which need not include metal) or otherwise a ferrous material (any material exhibiting ferro- or paramagnetism properties should be suitable) could be detected as a Hall probe causing a change in the magnetic flux of the magnetic sensor.

Figure 4:
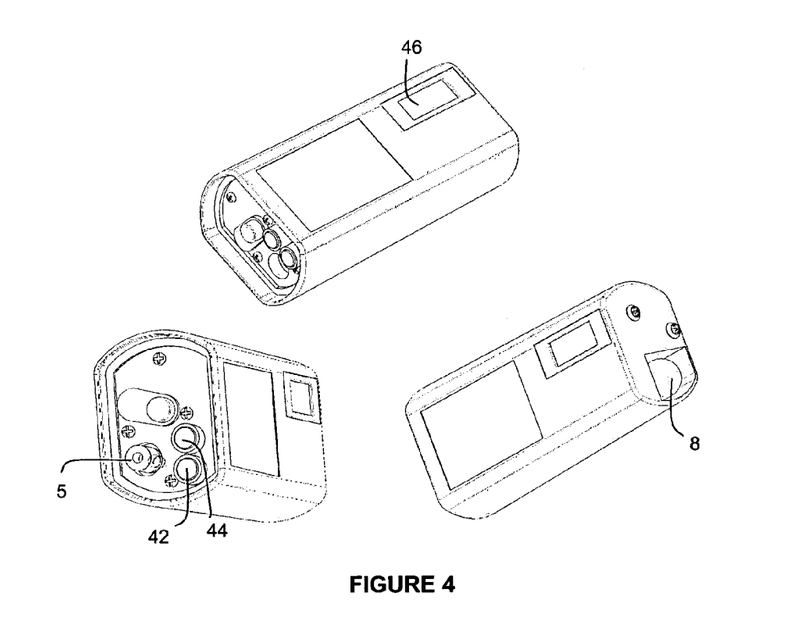
FIG. 4 are three views at different angles of the sensing device including its housing.

FIG. 4 show views of the embodiment of the sensing device (20) described, with its housing (22) on. These views also show the device power-up (42) and power-down (44) buttons as well as a display screen (46).

The size of the device is about the size of a matchbox (approximately 85×60 mm cross section×180 mm long), within which is fitted the pressure transducer (26), the signalling unit (34), the microprocessor and associated electronics, and the induction coil. A power source (e.g. a battery) is also included, as is an antenna for sending confirmatory signals to the head end of the conduit. The skilled person would appreciate that some or all of these components could comprise separate apparatus or devices sited outside the housing but connected thereto in use. Furthermore, due to the nature of the device and invention, it would be possible to locate the components in a variety of ways and locations relative to each other, to still obtain the benefit of the invention.

Figure 5:
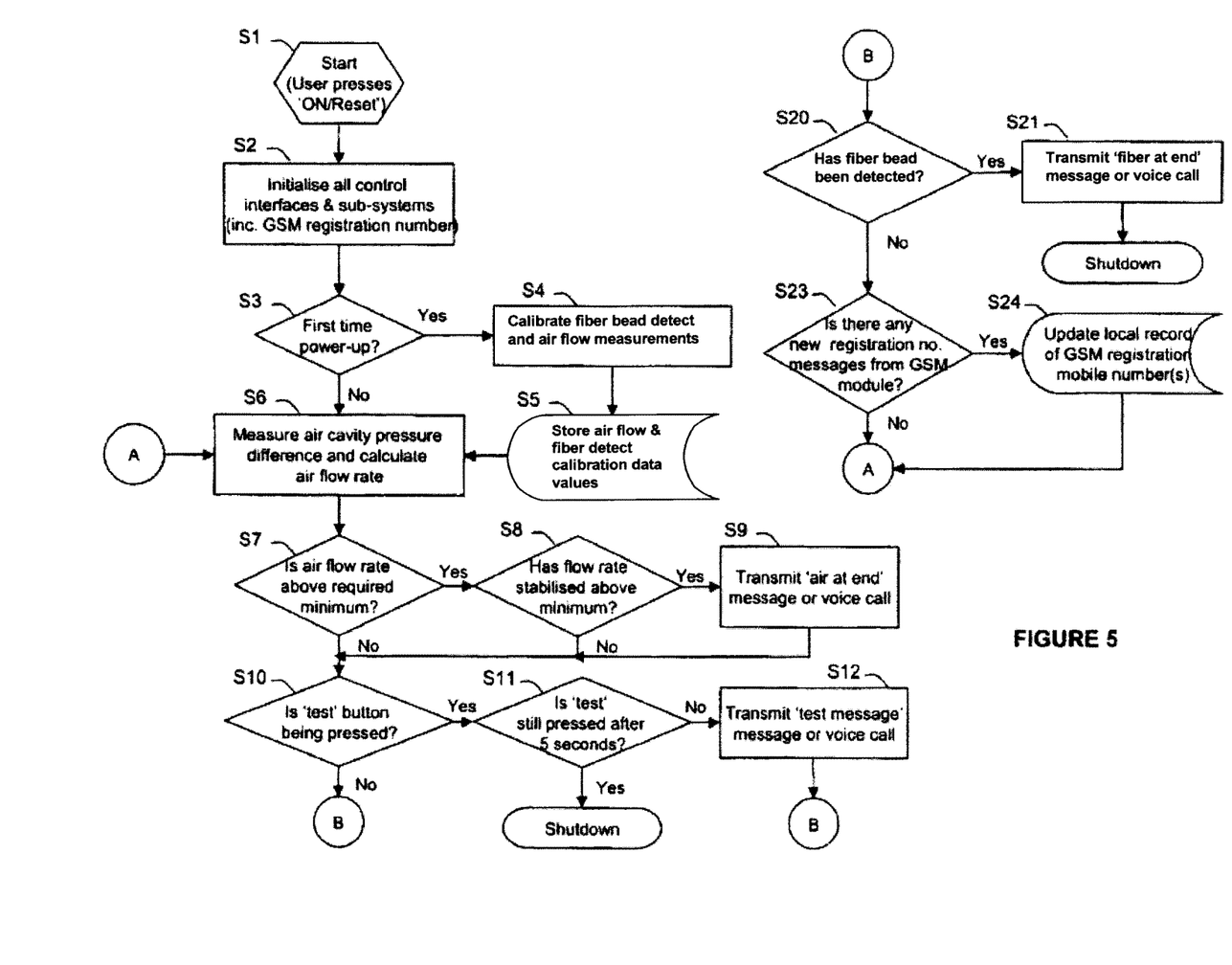
FIG. 5 is a flow chart depicting the functional steps of using the sensing device.

The flow chart in FIG. 5 describes the processes to detect and signal both air arrival and fiber unit arrival at the far end of the conduit being populated. In one embodiment, a microprocessor advantageously undertakes each or both processes although the skilled person would appreciate that a user may be able to manually select the required steps and/or add to the steps, or to override all or part of an automated process undertaken by the processor.

As noted above, the process starts with the operator travelling to the far end and installing the device onto the conduit end, which is then powered up by pressing (step S1) the "start" or "on" button (42), whereupon the device initialises itself (step S2). If it is detected that this is the first power on (step S3), a baseline ("minimum") air flow value is generated (steps S4, S5) for use in determining if air has arrived at the far end, as described above, by measuring any pressure differential (step S6). As shown in the flow chart, one implementation includes detecting that the air flow within the device bore or cavity has stabilised to a level above the baseline minimum level as being a clear unambiguous sign of air arrival (steps S7, S8) before transmitting a signal of air arrival at the far end (step S9).

In one embodiment, the sensing device is arranged to respond to "test" requests, in the manner shown in the flow chart (steps S10 to S13). It can be recalled that the head and remote ends are a fair distance from each other. This device mode allows the engineer to check that the device is powered on at the far end: he may have forgotten to turn the device on in the first place, or else so much time has elapsed without a signal arriving from the far end that either he is indeed feeding air into the wrong tube, or else the sensing device is not on or otherwise malfunctioning. By pressing the "test" button for an extended period (steps S10, S11), the device at the far end responds (if it can) by sending a response (step S13) to the test message request using the signalling methods described above.

Upon receiving the "air at end" confirmation signal (sent in step S9), the session progresses to the fibre installation stage, wherein the presence of the beaded fibre tip is sensed by detection of a frequency or other change in the inductance coil. Upon detection of the fiber bead (step S20), a confirmatory signal is transmitted to the head end (step S21), and the installation may then be terminated by the engineer by turning off the blowing head and compressor at the head end. He then travels to the remote end to remove the sensing device from the far end. It is possible to automate a part of the termination process, so that upon receipt of a signal that air has arrived at the remote end, the blowing head could start plying fiber into the conduit; and/or the apparatus could shut themselves off upon receipt of a signal that the fiber unit has arrived.

In one embodiment, an optional receiving device registration process is provided, which enables the engineer's receiving device (e.g. a GSM mobile telephone) to be registered to the sensing device, allowing for signals from the far end to reach the engineer at the head end as shown in the flow chart (steps S23, S24). The mobile telephone number or the like is stored in the GSM module and is read initially on power-up of the device, and whenever a serial message is passed from the GSM module to the main sensing device processor indicating that the number has been updated. This message is passed via the serial communications buffer in the microcontroller and checked approximately once a second for possible number updates.

The device and method are described to be deployed at the remote end can be also carried out in other ways (i.e. excluding some of the abovementioned steps, or including steps not mentioned). Furthermore, the installation apparatus may comprise components or elements not explicitly set out above. In particular, the sensing device may, with appropriate modifications, be fashioned as a sleeve to be used as a connector at intermediate points along the conduit route, for detection of the path taken by the air flow. This allows the operator to track the progress and movement of the air and the fibre unit for purposes in addition to, or other than for, installing blown fiber—such as in the detection of gaps leading to air leaks in the conduit tube network.

Although developed specifically for detection of air flow arrival and speeds in the particular context of the installation of blown fiber, the skilled person would realise the applicability of the apparatus and methods in other contexts and industries concerned with the detection of the existence of fluid flow and speed of travel or installation, such as within conduits and pipes for gas, water or oil.

In the current application in the context of blown fiber installations, use of a sensing method with no moving parts is particularly advantageous. This is because air flows and movements within the tube could be disturbed by a moving sensor device. The sensor itself could be affected by the air, as well as by debris and particularly the microspheres which coat the fiber units (which enhance the effect of viscous drag during installation, and which could fall off the fiber unit and be blown along the conduit by the pressurised air).

The methods, devices and configurations described above and in the drawings are for ease of description only and not meant to restrict the invention to any particular embodiments. It will be apparent to the skilled person that various sequences and permutations on the methods and devices described are possible within the scope of this invention as disclosed; similarly the invention could be used in various similar scenarios and for various cable types. In particular, the apparatus and methods relating to air arrival detection and fibre unit arrival detection work together advantageously in one embodiment. However the air arrival method and technique in particular is capable of use independently of the fiber arrival method.

The invention claimed is:

1. A device for detecting a flow of air from an exit end of a tube fed into an entrance end of the tube, and for detecting the arrival of a cable at the exit end of the tube, during a blown cable installation, the device comprising:
    a bore having a first bore section with a first bore size and a second bore section with a second bore size;
    an obstruction located within the bore between the first bore section and the second bore section, the obstruction comprising a narrowing section of the bore configured to obstruct air flowing from the exit end of the tube to the second bore section via the first bore section, and to retain a bead attached to the cable and exiting the exit end of the tube into the bore of the device;
    fixing means to fix the device to the tube so that the bore communicates with the exit end of the tube;
    an air pressure sensor for comparing air pressure within the first bore section and air pressure within the second bore section, so that a pressure differential is indicative of an air flow within the bore; and an induction coil being part of an LC oscillator operatively connected to the device located at or proximate to the obstruction for detection of the bead within the bore.

2. A device according to claim 1, further comprising a first air outlet communicating with the first bore section, and a second air outlet communicating with the second bore section, and wherein in use the air pressure sensor compares pressure of air flowing from the first bore section via the first air outlet, and pressure of air flowing from the second bore section via the second air outlet.

3. A device according to claim 1, wherein the first bore size is different from the second bore size.

4. A device according to claim 1, further comprising a signaling unit arranged in use to remotely signal at least one of presence of air flow within the bore or retention of the bead.

5. A device according to claim 4, wherein the signaling unit is a GSM mobile communication device.

6. A device according to claim 1, wherein at least one of the pressure sensor or the induction coil is operatively connected to a processor arranged to assist in detection of the air flow within the bore.

7. A device according to claim 6, wherein the processor is further arranged to activate the signaling unit.

8. A device according to claim 1, further comprising an air-porous barrier located at an end of the bore remote from the fixing means.

9. A method of detecting a flow of air from an exit end of a tube, and for detecting the arrival of a cable at the exit end of the tube, during a blown cable installation, the method comprising:
fixing a device to the tube so that a bore within the device communicates with the exit end of the tube, the device comprising
a bore having a first bore section with a first bore size and a second bore section with a second bore size,
an obstruction located within the bore between the first bore section and the second bore section, the obstruction comprising a narrowing section of the bore configured to obstruct air flowing from the exit end of the tube to the second bore section via the first bore section, and
fixing means to fix the device to the tube so that the bore communicates with the exit end of the tube, wherein in use, an air pressure sensor is used to compare air pressure within the first bore section and air pressure within the second bore section, so that a pressure differential is indicative of an air flow within the bore,
feeding air into an entrance end of the tube;
using an obstruction located within the bore of the device to obstruct air flowing from the exit end of the tube to a second bore section of the device via a first bore section of the device;
comparing air pressure levels within the first bore section and the second bore section;
signaling a pressure differential from the comparison as being indicative of an air flow within the bore;
feeding a cable into the entrance end of the tube;
using the obstruction to retain a bead attached to the cable; and
using an induction coil being part of an LC oscillator operatively connected to the device located at or proximate to the obstruction for detection of the bead within the bore to detect the presence of the bead within the device.

10. A method according to claim 9, including initializing the device by comparing air pressure within the first bore section and air pressure within the second bore section, before feeding air into an entrance end of the tube.

11. A method according to claim 9, further comprising:
feeding a cable tipped with a bead into the entrance end of the tube;
using an induction coil to detect retention of the bead within the device; and
signaling presence of the bead within the device as being indicative of cable arrival at the exit end of the tube.

* * * * *